United States Patent [19]
Gontowski, Jr.

[11] Patent Number: 5,862,301
[45] Date of Patent: Jan. 19, 1999

[54] MOTOR CONTROL WITH CLAMPED FILTER OUTPUT

[75] Inventor: Walter S. Gontowski, Jr., Thompson, Conn.

[73] Assignee: SGS-Thomson Microelectronics, Inc., Carrollton, Tex.

[21] Appl. No.: 140,220

[22] Filed: Oct. 21, 1993

[51] Int. Cl.$^6$ ...................................................... H02P 7/30
[52] U.S. Cl. ..................... 388/800; 388/809; 318/632; 323/282
[58] Field of Search ...................... 388/800, 801, 388/803, 805, 806, 809, 813; 318/138, 599, 636, 600, 254, 814, 815, 816, 632, 804, 430; 307/84; 363/44, 82, 89, 126, 90, 21; 323/207, 222, 282, 289, 284

[56] References Cited

U.S. PATENT DOCUMENTS

| | | |
|---|---|---|
| 3,749,891 | 7/1973 | Burrows et al. .......................... 318/636 |
| 3,900,781 | 8/1975 | Smith et al. .............................. 318/430 |
| 4,044,296 | 8/1977 | Dhyanchand et al. ..................... 307/84 |
| 4,088,943 | 5/1978 | Schmidt .................................... 318/138 |
| 4,225,290 | 9/1980 | Allington ................................... 318/48 |
| 4,683,529 | 7/1987 | Bucher, II .................................. 363/44 |
| 5,153,492 | 10/1992 | Landseadel ............................. 318/813 |
| 5,202,614 | 4/1993 | Peters et al. . |
| 5,202,616 | 4/1993 | Peters et al. . |
| 5,258,696 | 11/1993 | Le . |
| 5,319,289 | 6/1994 | Austin et al. . |
| 5,343,127 | 8/1994 | Maiocchi . |

OTHER PUBLICATIONS

IEEE Transactions on Consumer Electronics, vol. 35, No. 3, Aug. 1989, "A Full–Wave Motor Drive IC Based on the Back–EMF Sensing Principle", Bahlmann, pp. 415–420.

Electronic Components and Applications, vol. 10, No. 3, "Full–wave sensorless drive ICs for brushless DC motors", Dominique Pouilloux, pp. 2–11.

Proceedings of the Conference on Drives/Motors/Controls 1984, Paraskeva et al., "Microprocessor Control of a brushless D.C. motor".

Self Synchronisation of PM Step and Brushless Motors; A New Sensorless Approach, Antognini et al.

*Primary Examiner*—John W. Cabeca
*Attorney, Agent, or Firm*—Theodore E. Galanthay; Lisa K. Jorgenson; Christopher F. Regan

[57] ABSTRACT

A motor control circuit, including a filter amplifier which includes a clamping circuit to limit the maximum voltage of the filter amplifier. The filter amplifier is clamped to essentially the same level as the following error amplifier, which drives the power transistor which drives the motor. Thus, the requisite control voltage is normally present anyway (since this voltage is used to limit the amount of maximum current in the motor). Since the corresponding level of current is selected to ensure adequate current during start up, this signal is therefore appropriate to limit the output voltage of the filter amplifier. This improvement adds very little circuit complexity, and reduces the settling time of the motor controller at startup.

37 Claims, 5 Drawing Sheets

MOTOR CONTROL WITH CLAMPED FILTER OUTPUT

BACKGROUND AND SUMMARY OF THE INVENTION

The present application relates to integrated circuit motor controllers.

Figure 1:
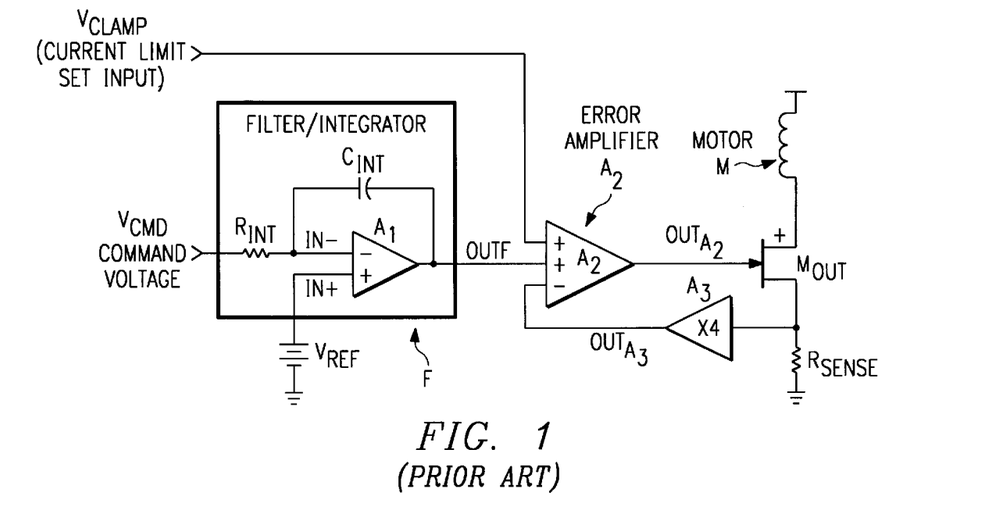
FIG. 1 is a simplified and partial block diagram of the motor speed control loop in a known motor controller.

In a typical closed loop control system (e.g. motor speed control), a means of introducing phase lead/lag is common to ensure loop stability. FIG. 1 is a simplified block diagram of the motor speed control loop found in an example of a spindle motor controller. Although not shown, an electronic circuit compares the motor speed and phase to a precision reference and generates a command voltage that controls the amount of current flowing in the motor. The speed is therefore controlled by controlling the motor current.

In order to compensate for the pole of the motor, a filter amplifier is normally used to shift the phase. In its simplest form, a resistor and capacitor form an integrator. The drawback of this scheme is that a finite time is required for the loop to settle when the motor is first spun up. In the prior art this time was greater than 10 seconds, which is excessively long for a system that must quickly spin up a hard disk drive for a computer system.

This excessive settling time is caused by the large output swing capability of the filter amplifier itself. The large output voltage swing requires that the capacitor be charged/discharged to the full range of the output voltage before it eventually settles to the normal operating point. This large swing is required to allow the controller to work with a variety of motors that have different requirements for start up current. Normally the start up current is roughly 10 times higher than the running current.

The present invention provides an improved motor control circuit, including an improved filter amplifier which includes a clamping circuit to limit the maximum voltage of the filter amplifier. The clamping circuit is controlled by a clamping voltage which is normally present anyway (since this voltage is used to limit the amount of maximum current in the motor). Since this level of current is selected to ensure adequate current during start up, this signal is therefore appropriate to limit the output voltage of the filter amplifier. With this improvement (which adds very little circuit complexity), the settling time has been reduced to under 4 seconds. Further optimization of the embedding network can provide further improvement in settling time.

According to a disclosed class of innovative embodiments, there is provided: a control circuit, comprising: a filter amplifier comprising a first input operatively connected to receive a command voltage and a second input operatively connected to receive a reference voltage, and further comprising one or more passive elements connected therewith; an error amplifier, integrated with said filter amplifier, and comprising a first input operatively connected to be driven by an output of said filter amplifier, an output connectable to drive a power transistor, and a second input connectable to receive a feedback value which is proportional to the current passed by the power transistor; wherein said filter amplifier and said error amplifier each comprise: a respective output transistor of a first majority-carrier conduction type connected to drive said respective output, and a respective clamp transistor of a second majority-carrier conduction type connected to limit the voltage on a control terminal of said respective output transistor, both said clamp transistors having respective control terminals thereof connected to a common constant voltage.

According to another disclosed class of innovative embodiments, there is provided: a control circuit, comprising: a filter amplifier comprising a first input operatively connected to receive a command voltage and a second input operatively connected to receive a reference voltage, and further comprising one or more passive elements connected therewith; an error amplifier, integrated with said filter amplifier, and comprising a first input operatively connected to be driven by an output of said filter amplifier, an output connectable to drive a power transistor, and a second input connectable to receive a feedback value which is proportional to the current passed by the power transistor; wherein said filter amplifier and said error amplifier each comprise: a respective output transistor connected to drive said respective output, and a respective clamp circuit connected to limit the voltage of said output to a common constant voltage.

According to another disclosed class of innovative embodiments, there is provided: a control circuit, comprising: a filter amplifier comprising a first input operatively connected to receive a command voltage and a second input operatively connected to receive a reference voltage, and further comprising one or more passive elements connected therewith; an error amplifier, integrated with said filter amplifier, and comprising a first input operatively connected to be driven by an output of said filter amplifier, an output connectable to drive a power transistor, and a second input connectable to receive a feedback value which is proportional to the current passed by the power transistor; wherein said filter amplifier incorporates a clamp circuit, which is connected to limit the voltage of said output thereof to a predetermined constant voltage.

According to another disclosed class of innovative embodiments, there is provided: a control circuit, comprising: a power transistor, having a first current-carrying terminal thereof connectable to an inductive load and a second current-carrying terminal thereof operatively connected, through a sensing resistor, to a power supply voltage; a filter amplifier comprising a first input operatively connected to receive a command voltage and a second input operatively connected to receive a reference voltage, and further comprising one or more passive elements connected therewith; an error amplifier, integrated with said filter amplifier, and comprising a first input operatively connected to be driven by an output of said filter amplifier, an output operatively connected to drive a control terminal of said power transistor, and a second input connected to receive a voltage from said sensing resistor; wherein said filter amplifier and said error amplifier each comprise: a respective output transistor of a first majority-carrier conduction type connected to drive said respective output, and a respective clamp transistor of a second majority-carrier conduction type connected to limit the voltage on a control terminal of said respective output transistor, both said clamp transistors having respective control terminals thereof connected to a common constant voltage.

According to another disclosed class of innovative embodiments, there is provided: a motor control system, comprising: a power transistor, having a first current-carrying terminal thereof connectable to an inductive load and a second current-carrying terminal thereof operatively connected, through a sensing resistor, to a power supply voltage; a filter amplifier comprising a first input operatively connected to receive a command voltage and a second input operatively connected to receive a reference voltage, and further comprising one or more passive elements connected therewith; an error amplifier, integrated with said filter amplifier, and comprising a first input operatively connected to be driven by an output of said filter amplifier, an output operatively connected to drive a control terminal of said power transistor, and a second input connected to receive a voltage from said sensing resistor; wherein said filter amplifier and said error amplifier each comprise: a respective output transistor of a first majority-carrier conduction type connected to drive said respective output, and a respective clamp transistor of a second majority-carrier conduction type connected to limit the voltage on a control terminal of said respective output transistor, both said clamp transistors having respective control terminals thereof connected to a common constant voltage; and a DC motor in series with the power transistor.

According to another disclosed class of innovative embodiments, there is provided: a method of controlling a motor, comprising the substantially continuous and simultaneous steps of: generating a command signal indicating the difference between the actual speed of the motor and a desired speed of the motor; filtering said command signal, using a operational amplifier combined with at least one active component, to produce a compensated control voltage; controlling a power transistor, which is connected to drive the motor, by an error amplifier which is connected to receive said compensated control voltage and which is also connected to receive a feedback voltage indicative of the current passed by said power transistor; and controlling said error amplifier and said operational amplifier to clamp the respective outputs thereof in common.

BRIEF DESCRIPTION OF THE DRAWING

The present invention will be described with reference to the accompanying drawings, which show important sample embodiments of the invention and which are incorporated in the specification hereof by reference, wherein.

DESCRIPTION OF THE PREFERRED EMBODIMENTS

The numerous innovative teachings of the present application will be described with particular reference to the presently preferred embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

FIG. 1 is a simplified block diagram of part of a motor speed control loop found in the SGS-Thomson L6238 spindle motor controller. An additional circuit (not shown) compares the motor speed and phase to a precision reference, and accordingly generates a command voltage $V_{cmd}$ that controls the amount of current flowing in the motor M. The speed is therefore controlled by controlling the motor current.

In order to compensate for the pole of the motor, a filter amplifier F is used to shift the phase. In its simplest form, a resistor $R_{int}$ and capacitor $C_{int}$ are connected to amplifier A1 to form an integrator. The drawback of this scheme is that a finite time is required for the loop to settle when the motor is first spun up. In the prior art this time was greater than 10 seconds, which is excessively long for a system that must quickly spin up a hard disk drive for a computer system.

Figure 2:
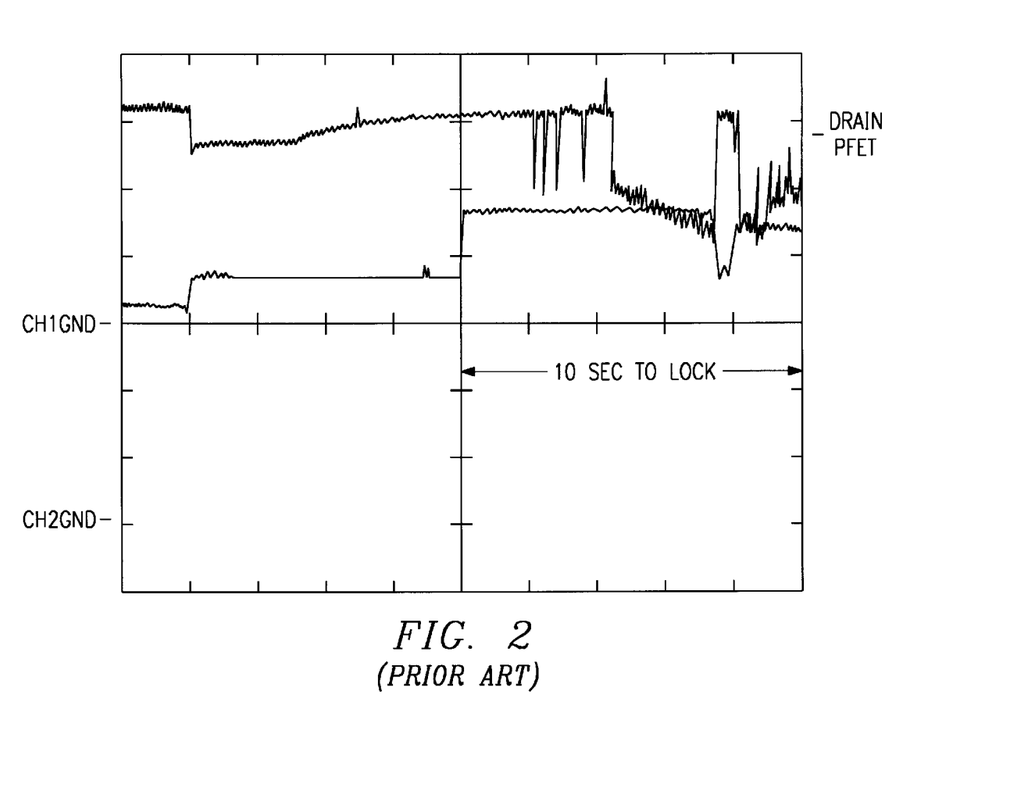
FIG. 2 is an oscilloscope printout of the prior circuit during the time required for the motor to spin up and "phase lock"

FIG. 2 is an oscilloscope printout of the prior art circuit during the time required for the motor to spin up and "phase lock". The top trace is the voltage seen at the drain of a power PFET $M_{out}$ used to control the amount of current in the motor M, as a function of phase error. The lower trace is the output voltage $V_{cmd}$ of the phase detector that generates the command voltage applied to the filter amplifier. The loop is designed to be at zero phase error (correct speed) when the lower trace is at typically 2 V. The settling time is normally measured from the time that this voltage first reaches 2 V until the time it "settles" at 2 V and the system phase locks. In the prior art, this time is approximately 10 seconds. This excessive settling time is caused by the large output swing capability of the filter amplifier itself. The large output voltage swing requires that the capacitor be charged/discharged to the full range of the output voltage before it eventually settles to the normal operating point. This large swing is required to allow the controller to work with a variety of motors that have different requirements for start up current. Normally the start up current is roughly 10 times higher than the running current.

Figure 3:
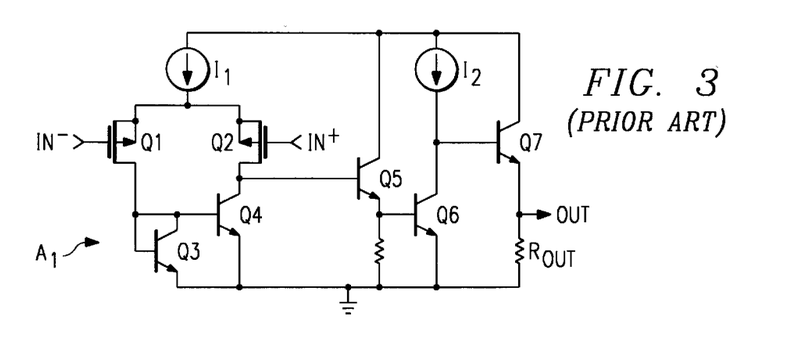
FIG. 3 is a simplified schematic of the filter amplifier used in the speed loop in the prior circuit.

FIG. 3 is a simplified schematic of the filter amplifier A1 used in the speed loop. This is a simple voltage amplifier, which is typical of the amplifiers used in this function in consisting of an input stage and a buffered gain stage. The output swing capability of this amplifier is from ground up to Vcc minus the voltage drops of Q7 and the current source driving it (or roughly Vcc-1 V).

In this circuit, current source I1 is shared between NMOS transistors Q1 (controlled by In$^-$) and Q2 (controlled by In$^+$). The current fraction passed by Q1 is mirrored through Q3/Q4, so that the base of Q5 is driven with a differential current dependent on In$^+$- In$^-$. Q5 (with Q6) provides buffering, so that the base of Q7 is driven by the difference between the output of current source I2 and the current passed by Q6.

Figure 4:
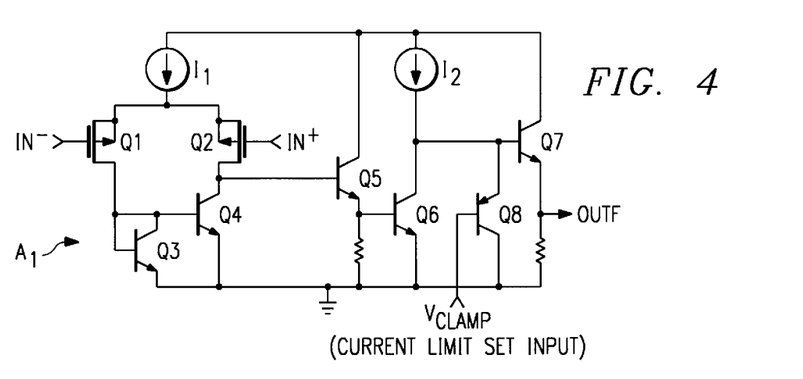
FIG. 4 shows an embodiment of the claimed invention, in which a clamping circuit is added to limit the maximum voltage that the output can rise to FIG. 5 shows the improved settling time achieved by the circuit of FIG. 4.

FIG. 4 shows an improved amplifier A1', which is advantageously substituted for the filter amplifier A1 of FIG. 3 in a motor controller like that shown in FIG. 1. The inventive embodiment shown in FIG. 4 adds a clamping circuit (implemented by Q8 in this example) that limits the maximum voltage that the output of filter amp A1 can rise to. The operation of this circuit is generally similar to that of FIG. 3, EXCEPT THAT Q8 will turn on whenever the base of output transistor Q7 rises to a voltage greater than $V_{clamp}$+ $V_{BEPNP}$. Thus, the output Out$_F$ will be clamped to approximately $V_{clamp}$ (or more precisely $V_{clamp}+V_{BEPNP}-V_{BENPN}$).

The clamping circuit receives its clamping voltage $V_{clamp}$ from a circuit that is normally used to limit the amount of maximum current in the motor. (Note that $V_{clamp}$ also appears as an input to the error amplifier A2 in FIG. 1.) Since this level of current is selected to ensure adequate current during start up, this signal is therefore appropriate to limit the output voltage of the filter amplifier.

Now suppose that the value for $R_{sense}$ in FIG. 1 is (for example) 0.33Ω, and that a 2 Amp startup current is desired for the particular motor M being used. At this startup current, the output $Out_{A3}$ of A3, would be 2.64V ($I*R_{sense}*4 = 2A*0.33Ω*4 = 2.64$ V, where 4 is a constant given by the X4 amplifier A3). To achieve this startup current, the output voltage $Out_F$ at the output of the filter must therefore have at least this value. The base of Q8 is therefore set at 2.64 V externally to ensure that even under abnormal conditions the motor current cannot exceed 2A. Thus at startup the output of the filter amplifier will never exceed 2.64 V, resulting in much lower overshoot and faster settling time.

Figure 5:
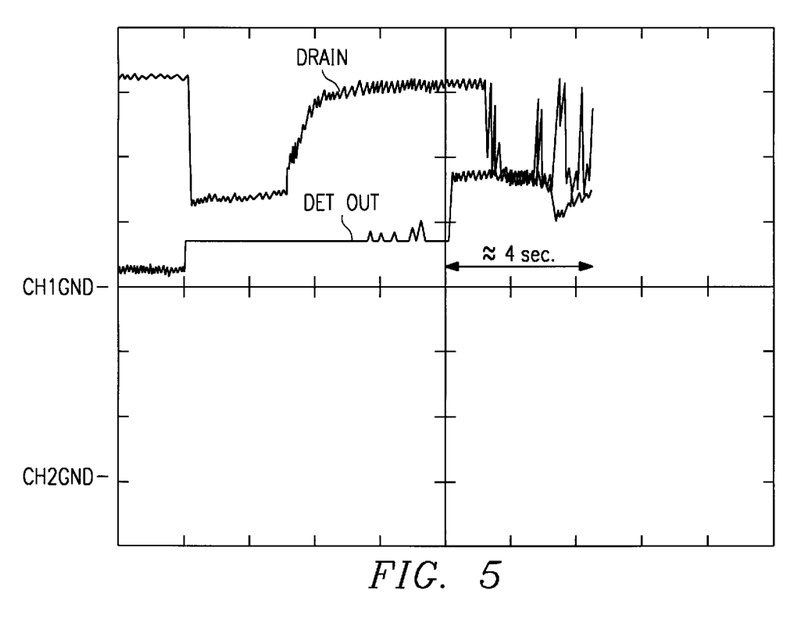

FIG. 5 shows the improvement obtained by substitution of the circuit of FIG. 4 for the circuit of FIG. 3. (FIGS. 2 and 5 were generated under the same conditions, aside from the presence of the innovative improvement. In both cases, a compensation capacitor of 0.068 μF was connected to the amplifier A1 or A1'.) As a comparison of FIGS. 2 and 5 shows, the settling time has been greatly reduced (to under 4 seconds in the example shown). Further optimization of the embedding network can provide further improvement in settling time.

The value of the Current Limit Set Input ($V_{clamp}$), in the presently preferred embodiment, is set by a resistor string. This value is preferably adjustable, to adapt to different choices of motor and/or power transistor. This can be accomplished not only by a metal-optioned resistor string, but also by use of nonvolatile bits (to select a tap point in a resistor string), by bonding option, by permitting an external input, etc. Alternatively, the multiplier value in the feedback from $R_{sense}$ can be varied, in addition to or instead of variation in $V_{clamp}$.

Figure 6:
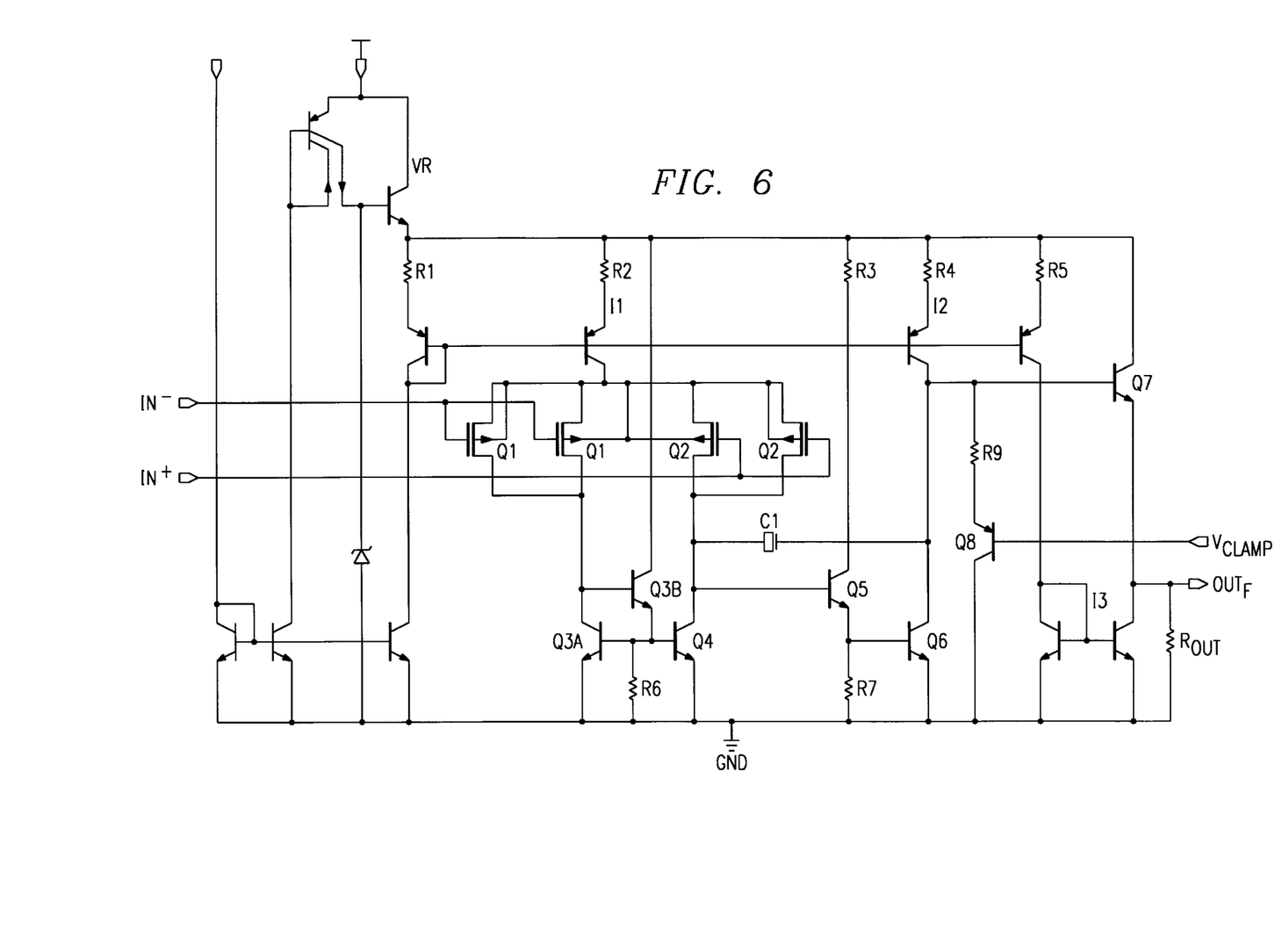
FIG. 6 shows a further improved embodiment, wherein an additional resistor has been added to compensate for VBE mismatch.

FIG. 6 shows a further embodiment in greater detail. In this embodiment, illustrative device dimensions are indicated for several of the devices, and well connections are shown for the resistors. Note that a resistor R9 has been added between transistor Q8 and the base of output transistor Q7. This additional resistor compensates for possible VBE mismatch between the PNP clamping transistor and the NPN output transistor.

Figure 7:
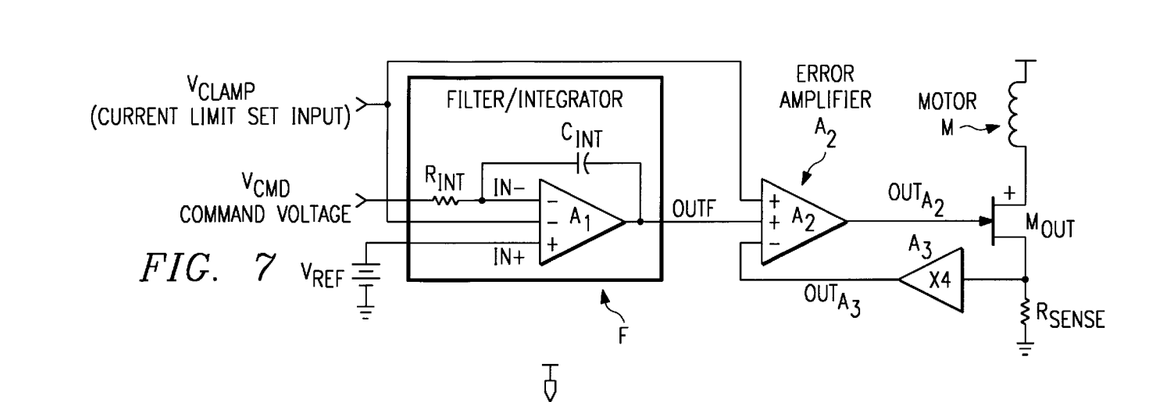
FIG. 7 is a simplified block diagram of the motor speed control loop in an improved motor controller as enabled by the disclosed inventions.

FIG. 7 shows a modified version of the circuit diagram of FIG. 1, indicating the parallel connection of $V_{clamp}$, into both the error amplifier A2 and the filter amplifier A1, which is used in the presently preferred embodiment.

Figure 8:
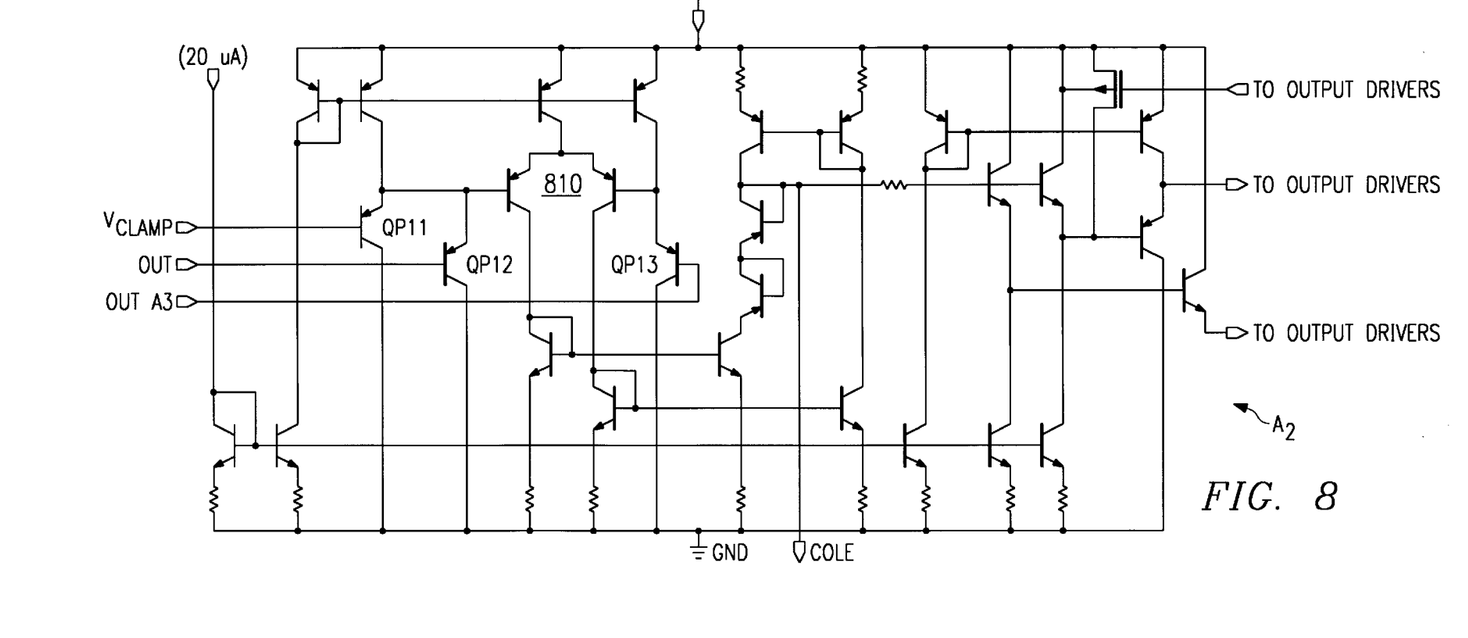
FIG. 8 shows the circuit of the error amplifier of the presently preferred embodiment.

FIG. 8 shows the circuit of the error amplifier A2, in the presently preferred embodiment. This circuit is generally conventional, but is included here to show its relation to the structure of the filter amplifier A1. In error amplifier A2, differential amplifier stage 810 is driven by matched PNP input transistors QP12 (driven by the output $Out_F$ of the filter amplifier A1) and QP13 (driven by signal $Out_{A3}$ from the X4 feedback amplifier A3). Note that the PNP QP12 is shunted by another PNP QP11, which is driven by the same input $V_{clamp}$ which is connected to define a clamping level for the output of filter amplifier A1.

Figure 9:
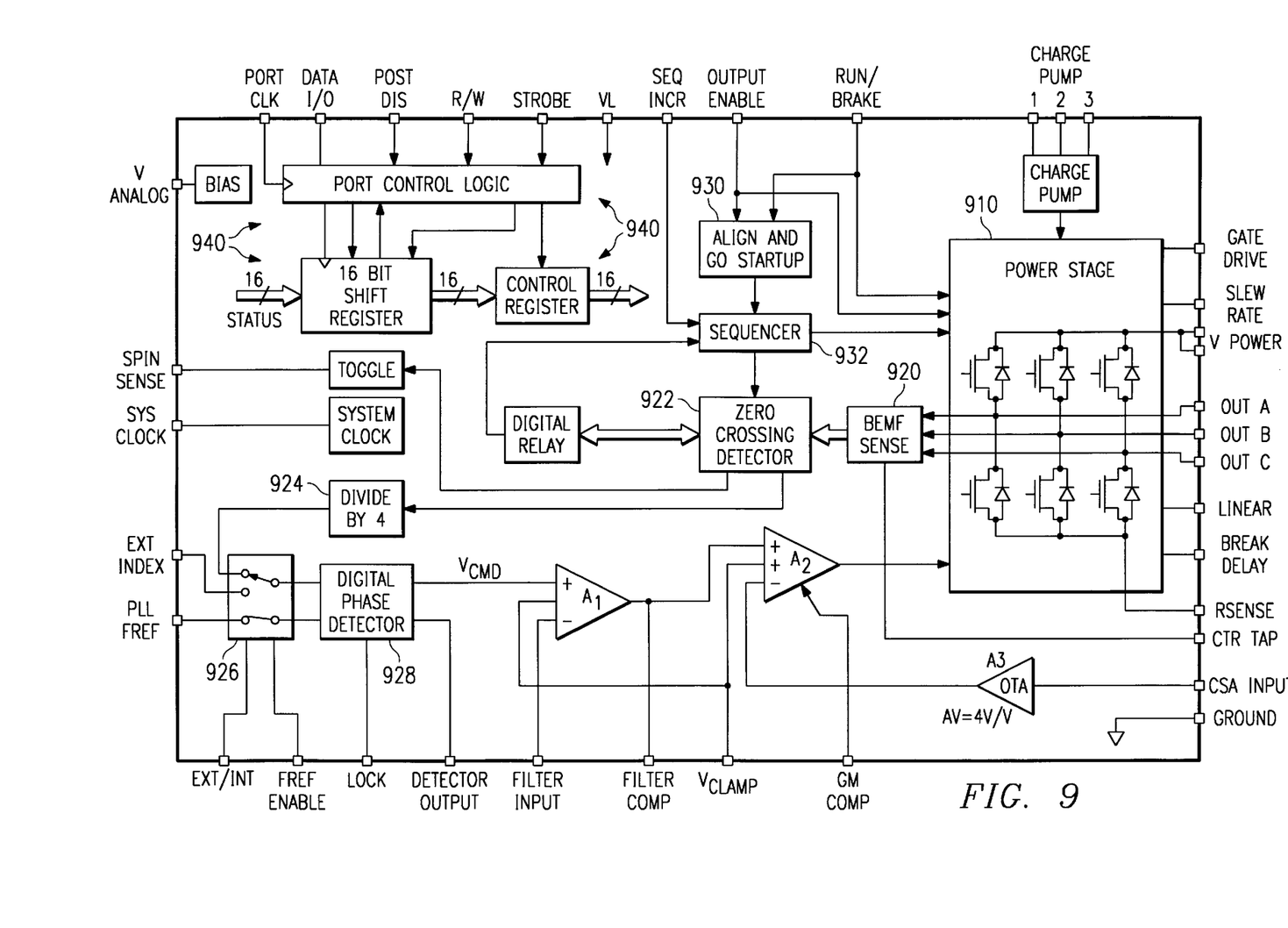
FIG. 9 is a block diagram of the entire motor controller chip of the presently preferred embodiment.

FIG. 9 is a block diagram of the entire motor controller chip of the presently preferred embodiment. This is not the only context in which the disclosed circuit innovations can be used, but this context does confer advantages. Moreover, this subsystem embodiment is itself novel and advantageous.

The illustrated system is a sensorless spindle motor controller. In fact, this system provides a complete three-phase DC brushless spindle motor driver system. This chip, in the presently preferred embodiment, includes a power section, which can provide 2.5A motor drive. (Alternatively, an external linear driver can be added for greater power- or current-handling capacity.) Motor startup can be performed by a simple align-and-go procedure which is stored on-chip, or by manual sequencing (to follow a user-defined startup algorithm). A digital phase-locked loop provides the capability to use master/slave synchronization for disk array applications. Programmable functions include commutation timing adjustment and slew rate control. Protective features include stuck rotor and backward rotation detection, as well as automatic thermal shutdown.

A power stage 910, supplied by an external supply input Vpower, drives output lines $OUT_A$–$OUT_C$. A Back EMF detector stage 920, followed by a Zero Crossing Detector 922, provides detection of rotor position using detection of back EMF, i.e. of voltages present on the individual motor windings when they are not being driven by the output transistors of the power stage 910. The signals from the zero-crossing detector 922 are connected, through divider circuit 924 and switch block 926, to digital phase detector 928. Detector 928, in conventional fashion, produces the command voltage $V_{cmd}$ which is the input to filter amplifier A1, as discussed above. Note that external pin connects are provided for the passive components, and for the clamp voltage $V_{clamp}$. Error amplifier A2 provides output $out_{A2}$ to control the power stage 910, as discussed above. (However, during startup the power stage is controlled by startup logic 930 and sequencer 932.) The port interface and control logic are not especially relevant to the present invention, and are generally designated as 940.

FURTHER MODIFICATIONS AND VARIATIONS

It will be recognized by those skilled in the art that the innovative concepts disclosed in the present application can be applied in a wide variety of contexts. Moreover, the preferred implementation can be modified in a tremendous variety of ways. Accordingly, it should be understood that the modifications and variations suggested below and above are merely illustrative. These examples may help to show some of the scope of the inventive concepts, but these examples do not nearly exhaust the full scope of variations in the disclosed novel concepts.

For example, the specific device values shown are not by any means necessary to make use of the innovative concepts. These values are merely illustrative, and can be readily varied.

For example, the specific topography of the circuits shown in FIGS. 1, 4 and/or 6 is not by any means necessary to make use of the innovative concepts. As will be readily recognized by skilled designers, elements can be added or modified in numerous ways.

For another example, dual versions of the circuits shown (in which power and ground connections are interchanged, PNPs and NPNs are interchanged, and NMOS and PMOS devices are interchanged) can be readily substituted. Moreover, by appropriate addition or deletion of intermediate stages (such as current mirrors), it is possible to substitute polarity-reversed versions of some but not all stages.

For another example, in a CBCMOS (complementary-bipolar-CMOS) process, the clamping function of PNP transistor Q8 could alternatively be performed by a PMOS transistor.

For another example, the clamping function of PNP transistor Q8 could alternatively be performed by a hard-wired circuit (such as a diode string) which implemented a fixed clamp voltage. Such embodiments are much less preferable (since flexibility in adaptation to different motors is lost, as well as precision and/or compactness); but such embodiments would preserve some, but not all, of the advantages of the preferred embodiment.

For example, other passive networks can be used instead of the RC circuit used for the filter amplifier in the presently preferred embodiment.

As will be recognized by those skilled in the art, the innovative concepts described in the present application can be modified and varied over a tremendous range of applications, and accordingly the scope of patented subject matter is not limited by any of the specific exemplary teachings given.

What is claimed is:

1. A control circuit, comprising:
   a filter amplifier comprising a first input operatively connected to receive a command voltage and a second input operatively connected to receive a reference voltage, and further comprising one or more passive elements connected therewith;
   an error amplifier, integrated with said filter amplifier, and comprising a first input operatively connected to be driven by an output of said filter amplifier, an output connectable to drive a power transistor, and a second input connectable to receive a feedback value which is proportional to the current passed by the power transistor;
   wherein said filter amplifier and said error amplifier each comprise:
      a respective output transistor of a first majority-carrier conduction type connected to drive said respective output, and
      a respective clamp transistor of a second majority-carrier conduction type connected to limit the voltage on a control terminal of said respective output transistor,
      both said clamp transistors having respective control terminals thereof connected to a respective common constant voltage to limit said outputs of respective said amplifiers when said respective amplifiers are operating.

2. The circuit of claim 1, further comprising a scaling amplifier interposed before said second input of said error amplifier.

3. The circuit of claim 1, further comprising an additional resistor interposed between said clamp transistor and said control terminal of said output transistor.

4. The circuit of claim 1, further comprising the power transistor.

5. The circuit of claim 1, wherein said output of said error amplifier is connectable to drive a P-channel field effect power transistor.

6. The circuit of claim 1, wherein said output of said error amplifier is connectable to drive a field effect power transistor.

7. The circuit of claim 1, further comprising a DC motor in series with the power transistor.

8. The circuit of claim 1, further comprising a DC motor and a sense resistor in series with the power transistor, said sense resistor having a value of less than one ohm and being operatively connected to said second input of said error amplifier.

9. The circuit of claim 1, further comprising a sense resistor, having a value of less than one ohm, connected in series with the power transistor, and operatively connected to said second input of said error amplifier.

10. A control circuit, comprising:
    a filter amplifier comprising a first input operatively connected to receive a command voltage and a second input operatively connected to receive a reference voltage, and further comprising one or more passive elements connected therewith;
    an error amplifier, integrated with said filter amplifier, and comprising a first input operatively connected to be driven by an output of said filter amplifier, an output connectable to drive a power transistor, and a second input connectable to receive a feedback value which is proportional to the current passed by the power transistor;
    wherein said filter amplifier and said error amplifier each comprise:
       a respective output transistor connected to drive said respective output, and
       a respective clamp circuit connected to limit the voltage of said output of its respective said amplifier to a common constant voltage when its respective said amplifier is operating.

11. The circuit of claim 10, further comprising a scaling amplifier interposed before said second input of said error amplifier.

12. The circuit of claim 10, further comprising an additional resistor interposed between said clamp transistor and said control terminal of said output transistor.

13. The circuit of claim 10, further comprising a power transistor.

14. The circuit of claim 10, wherein said output of said error amplifier is connectable to drive a P-channel field effect power transistor.

15. The circuit of claim 10, wherein said output of said error amplifier is connectable to drive a field effect power transistor.

16. The circuit of claim 10, further comprising a DC motor in series with the power transistor.

17. The circuit of claim 10, further comprising a sense resistor, having a value of less than one ohm, connected in series with the power transistor, and operatively connected to said second input of said error amplifier.

18. A control circuit, comprising:
    a filter amplifier comprising a first input operatively connected to receive a command voltage and a second input operatively connected to receive a reference voltage, and further comprising one or more passive elements connected therewith;
    an error amplifier, integrated with said filter amplifier, and comprising a first input operatively connected to be driven by an output of said filter amplifier, an output connectable to drive a power transistor, and a second input connectable to receive a feedback value which is proportional to the current passed by the power transistor;
    wherein said filter amplifier incorporates a clamp circuit, which is connected to limit the voltage of said output thereof to a predetermined constant voltage when said respective amplifier is operating.

19. The circuit of claim 18, further comprising a scaling amplifier interposed before said second input of said error amplifier.

20. The circuit of claim 18, further comprising an additional resistor interposed between said clamp transistor and said control terminal of said output transistor.

21. The circuit of claim 18, wherein said output of said error amplifier is connectable to drive a P-channel field effect power transistor.

22. The circuit of claim 18, wherein said output of said error amplifier is connectable to drive a field effect power transistor.

23. The circuit of claim 18, further comprising a DC motor in series with the power transistor.

24. The circuit of claim 18, further comprising a DC motor and a sense resistor in series with the power transistor, said sense resistor having a value of less than one ohm and being operatively connected to said second input of said error amplifier.

25. The circuit of claim 18, further comprising a sense resistor, having a value of less than one ohm, connected in series with the power transistor, and operatively connected to said second input of said error amplifier.

26. A motor control circuit, comprising:
a power transistor, having a first current-carrying terminal thereof connectable to an inductive load and a second current-carrying terminal thereof operatively connected, through a sense resistor, to a power supply voltage;
a filter amplifier comprising a first input operatively connected to receive a command voltage and a second input operatively connected to receive a reference voltage, and further comprising one or more passive elements connected therewith;
an error amplifier, integrated with said filter amplifier, and comprising a first input operatively connected to be driven by an output of said filter amplifier, an output operatively connected to drive a control terminal of said power transistor, and a second input connected to receive a voltage from said sense resistor;
wherein said filter amplifier and said error amplifier each comprise:
a respective output transistor of a first majority-carrier conduction type connected to drive said respective output, and
a respective clamp transistor of a second majority-carrier conduction type connected to limit the voltage on a control terminal of said respective output transistor,
both said clamp transistors having respective control terminals thereof connected to a common constant voltage to limit the voltages of said outputs of respective said amplifiers when said respective amplifiers are operating.

27. The circuit of claim 26, further comprising a scaling amplifier interposed before said second input of said error amplifier.

28. The circuit of claim 26, further comprising an additional resistor interposed between said clamp transistor and said control terminal of said output transistor.

29. The circuit of claim 26, wherein said output of said error amplifier is connectable to drive a field effect power transistor.

30. The circuit of claim 26, wherein said output of said error amplifier is connectable to drive a P-channel field effect power transistor.

31. The circuit of claim 26, further comprising a DC motor in series with the power transistor.

32. The circuit of claim 26, further comprising a DC motor and a sense resistor in series with the power transistor, said sense resistor having a value of less than one ohm and being operatively connected to said second input of said error amplifier.

33. The circuit of claim 26, further comprising a sense resistor, having a value of less than one ohm, connected in series with the power transistor, and operatively connected to said second input of said error amplifier.

34. A method of controlling a motor, comprising the substantially continuous and simultaneous steps of:
(A.) generating a command signal indicating the difference between the actual speed of the motor and a desired speed of the motor;
(B.) filtering said command signal, using an operational amplifier combined with at least one active component, to produce a compensated control voltage;
(C.) controlling a power transistor, which is connected to drive the motor, by an error amplifier which is connected to receive said compensated control voltage and which is also connected to receive a feedback voltage indicative of the current passed by said power transistor; and
(D.) controlling said error amplifier and said operational amplifier to clamp the output of said error amplifier in common with the output of said operational amplifier when said amplifiers are operating.

35. The method of claim 34, wherein said controlling step (d) uses a common constant voltage which is supplied both to said filter amplifier and also to said error amplifier.

36. The method of claim 34, wherein said controlling step (c) uses a feedback voltage which is multiplied by a scaling amplifier interposed before said second input of said error amplifier.

37. The method of claim 34, wherein said controlling step (c) uses a sense resistor, having a value of less than one ohm, connected in series with the power transistor, and operatively connected to said second input of said error amplifier.

* * * * *